(12) United States Patent
Ohira

(10) Patent No.: US 8,565,311 B2
(45) Date of Patent: Oct. 22, 2013

(54) IMAGE PROCESSING APPARATUS AND METHOD THEREOF

(75) Inventor: Tadashi Ohira, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1095 days.

(21) Appl. No.: 12/242,469

(22) Filed: Sep. 30, 2008

(65) Prior Publication Data

US 2009/0086821 A1    Apr. 2, 2009

(30) Foreign Application Priority Data

Oct. 1, 2007  (JP) .................................. 2007-258037

(51) Int. Cl.
- H04N 7/12 (2006.01)
- H04N 11/02 (2006.01)
- H04N 11/04 (2006.01)
- G06K 9/40 (2006.01)

(52) U.S. Cl.
USPC ................. 375/240.16; 382/263; 375/240.01; 375/240.21

(58) Field of Classification Search
None
See application file for complete search history.

(56) References Cited

U.S. PATENT DOCUMENTS

| | | | |
|---|---|---|---|
| 5,136,376 A * | 8/1992 | Yagasaki et al. | 375/240.23 |
| 5,949,908 A * | 9/1999 | Sugahara | 382/232 |
| 6,167,157 A * | 12/2000 | Sugahara | 382/236 |
| 6,904,096 B2 * | 6/2005 | Kobayashi et al. | 375/240.26 |
| 6,996,184 B2 | 2/2006 | Hamamatsu | |
| 2002/0097335 A1 * | 7/2002 | Kobayashi et al. | 348/384.1 |
| 2004/0179743 A1 * | 9/2004 | Shibata et al. | 382/239 |
| 2006/0056516 A1 | 3/2006 | Hamamatsu | |
| 2007/0070250 A1 * | 3/2007 | Zhou et al. | 348/607 |
| 2007/0140333 A1 * | 6/2007 | Chono et al. | 375/240.03 |
| 2007/0140345 A1 * | 6/2007 | Osamoto et al. | 375/240.16 |

FOREIGN PATENT DOCUMENTS

| | | |
|---|---|---|
| JP | 2001-218210 | 8/2001 |
| JP | 2002-077917 A | 3/2002 |
| JP | 2006-325155 A | 11/2006 |

OTHER PUBLICATIONS

Japanese Office Action for Appln. No. 2007-258037 dated Oct. 14, 2011.

* cited by examiner

Primary Examiner — Nathan Flynn
Assistant Examiner — Trang Doan
(74) Attorney, Agent, or Firm — Carter, DeLuca, Farrell & Schmidt LLP

(57) ABSTRACT

A frame image of decoded image data in which an image stream generated by performing an orthogonal transformation and a lossy compression coding has been decoded is inputted so as to be stored in a frame memory for each block, and based on the stored frame image and a newly input frame image, a motion vector for each block is detected, and a motion vector variance map generator calculates a variance value map by calculating a variance value of the motion vectors. Based on the variance value map and a threshold, an outline domain included in the frame image is extracted, and a band limiting filter performs band limitation for each block in regard to the outline domain so as to accomplish removal of noise from the decoded image.

16 Claims, 9 Drawing Sheets

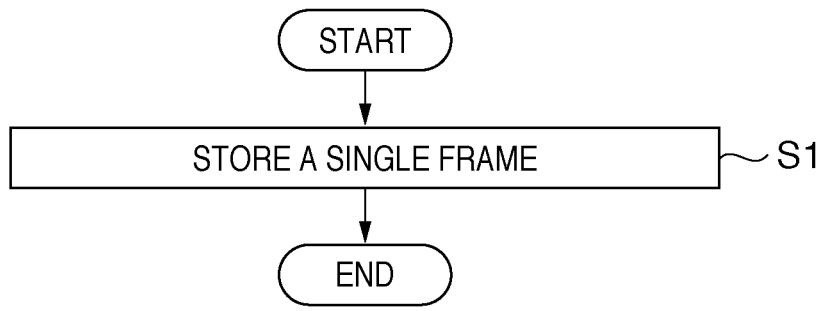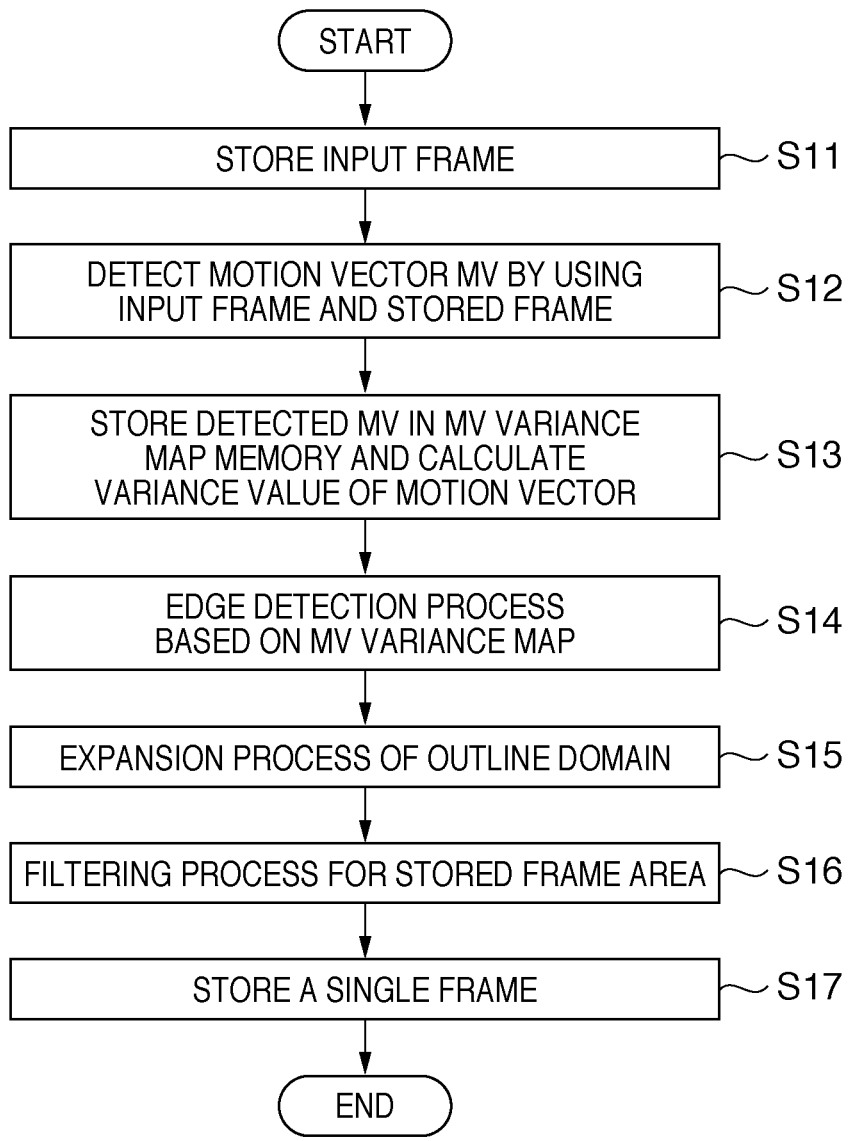

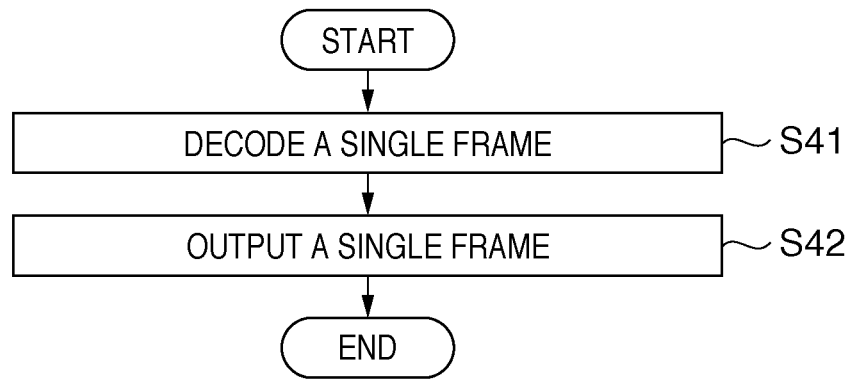
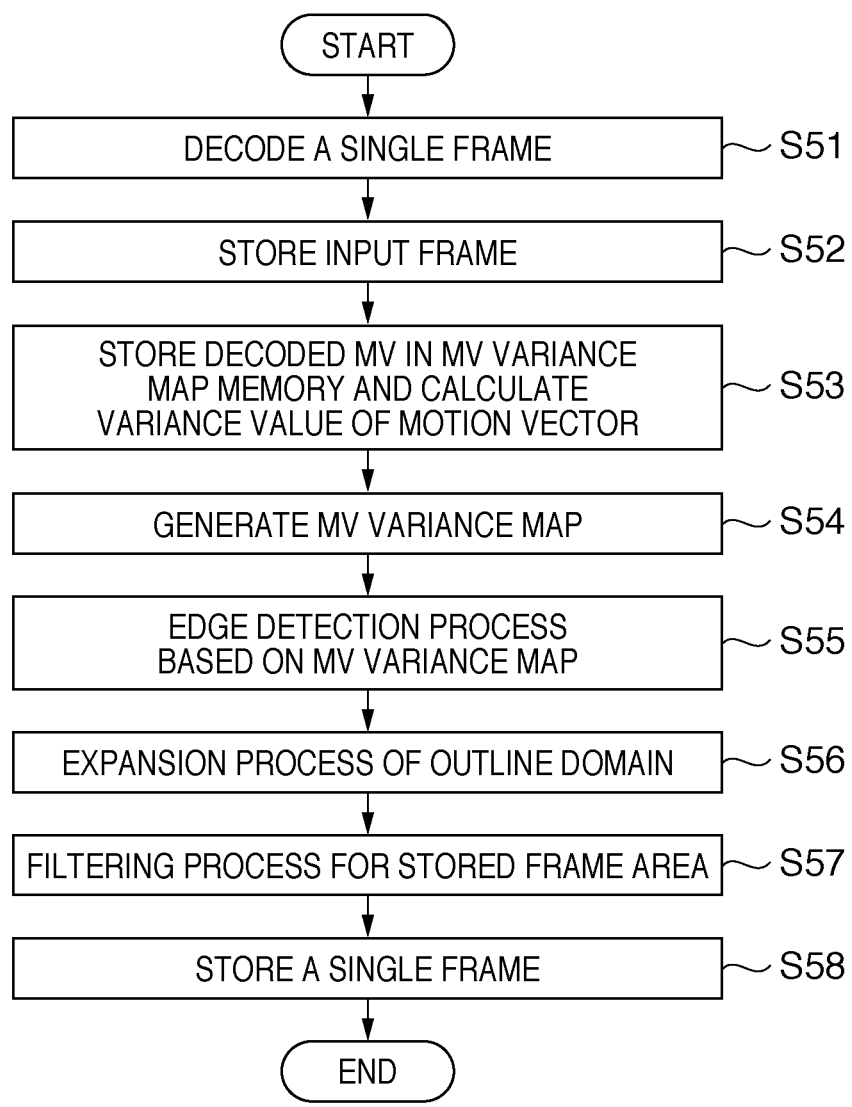

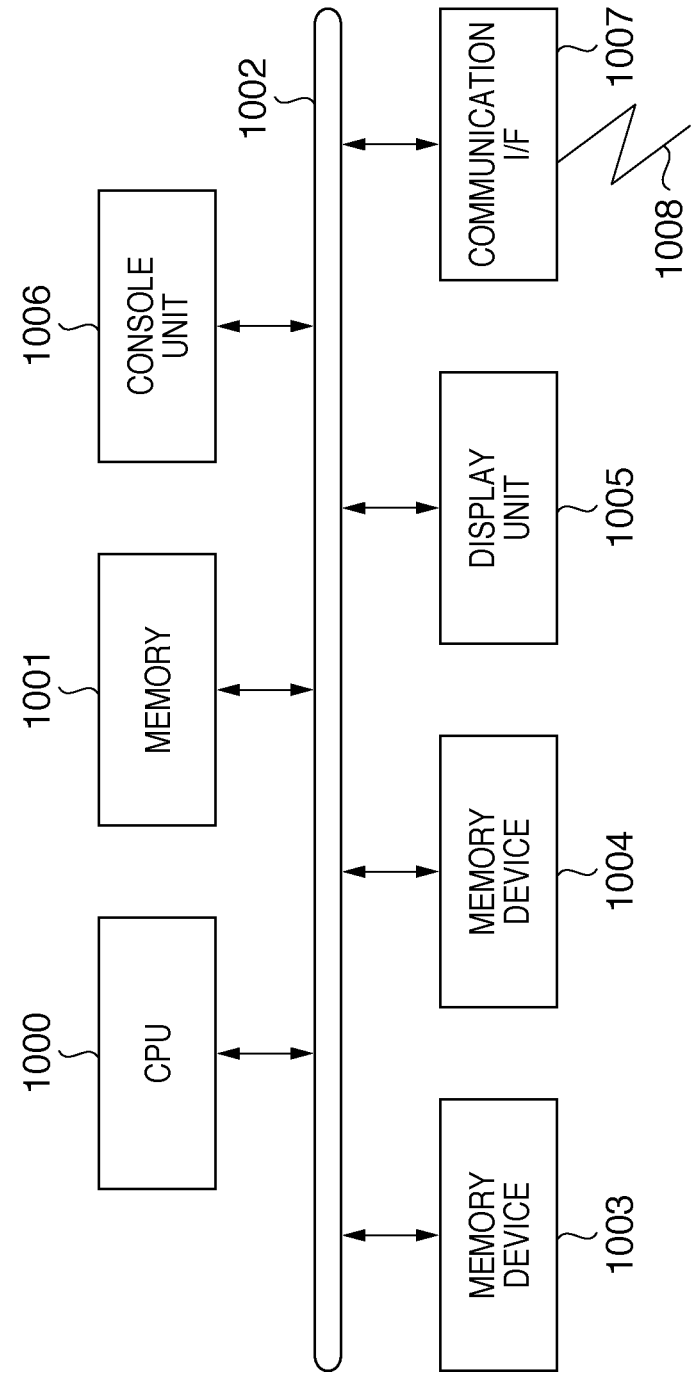

IMAGE PROCESSING APPARATUS AND METHOD THEREOF

BACKGROUND OF THE INVENTION

1. Field of the Invention

The present invention relates to an image processing apparatus for detecting and removing noise that is included in an image resulting from decoding image data obtained through lossy coding, such as the MPEG (Moving Picture Experts Group) system, and further relates to a method thereof.

2. Description of the Related Art

Conventional image coding schemes include Motion JPEG, which is an intraframe coding scheme; coding schemes for digital video or the like; and H.261, H.263, MPEG-1, and MPEG-2, which use inter-frame predictive coding. In addition, recently, coding schemes such as H.264 are also known. For these coding schemes, international standards have been established by the ISO (International Organization for Standardization) and the ITU (International Telecommunication Union).

MPEG-2, which is a representative coding scheme, is called "lossy coding", and the image data coded with this coding scheme cannot be perfectly restored by decoding. This is because at the time of coding, quantization is performed after a DCT transformation. These coding schemes reduce the amount of data by removing redundancy included in the subject signals by utilizing the statistical nature of image signals. In other words, since human vision is not sensitive to high-frequency components of images, redundancy is removed by roughly quantizing such high-frequency components so as to achieve a high coding efficiency.

However, in a lossy coding in which this type of DCT transformation is performed, data is compressed by limiting high-frequency components, and thus noise called "mosquito noise" occurs on the edge portions of images or around moving objects, and this noise causes reduced image quality in the decoded image. Methods for reducing such mosquito noise have been proposed, and in Japanese Patent Laid-Open No. 2001-218210, a method for obtaining an image signal with reduced mosquito noise by detecting an edge portion of an input image signal and filtering the edge portion of the image signal with a noise removal filter has been proposed. For the details of other items, such as the MPEG system, see the international standards established by ISO/IEC.

However, in the above-mentioned conventional art, since the filtering process for removing mosquito noise is performed on edge portions of image signals regardless of the presence or absence of mosquito noise in the image signals, portions without mosquito noise suffer from image deterioration. In addition, when a texture area that includes fine edges is included, the area is erroneously determined to be an edge, and the texture information is removed. The result is a reduction of the image quality.

These problems are due to noise removal process being performed on edge portions of image signals without accurately detecting the noise portions, such as mosquito noise, included in the image obtained through decoding of frequency-transformed or lossy coded image data. The problems are also due to noise removal processes being performed by considering texture areas of image signals that include fine edges to be noise portions.

SUMMARY OF THE INVENTION

The present invention is directed to an image processing apparatus and an image processing method.

The image processing apparatus of the present invention removes a portion with noise, such as mosquito noise, included in decoded image data in which an image stream generated by performing orthogonal transformation and lossy coding has been decoded.

According to an aspect of the present invention, there is provided an image processing apparatus for removing a noise component of decoded image data in which an image stream generated through a lossy coding has been decoded. The apparatus includes a storage unit configured to input and store a frame image for each block; a motion vector detector configured to detect a motion vector of each block based on the frame image stored in the storage unit and a newly input frame image; a variance calculator configured to generate a variance value map by calculating a variance value of the motion vector detected by the motion vector detector; an outline extraction unit configured to extract an outline domain included in the frame image based on the variance value map calculated by the variance calculator and a threshold; and a band limiting unit configured to perform band limitation for each block in regard to the outline domain extracted by the outline extraction unit.

According to an aspect of the present invention, there is provided an image processing method for removing a noise component of decoded image data in which an image stream generated through a lossy coding has been decoded. The method includes inputting and storing a frame image for each block in a frame memory; detecting a motion vector of each block based on the frame image stored in the frame memory and a newly-input frame image; generating a variance value map by calculating a variance value of a motion vector detected in the detecting step; extracting an outline domain included in the frame image based on the variance value map generated in the generating step and a threshold; and performing band limitation for each block in regard to the outline domain extracted in the extracting step.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a flowchart illustrating processing of the first frame in the image processing apparatus according to the embodiment of the present invention.

FIG. 3 is a flowchart illustrating processing of the frames subsequent to the first frame in the image processing apparatus according to the embodiment.

FIG. 10 is a flowchart illustrating processing of the first frame according to the third embodiment.

FIG. 11 is a flowchart illustrating processing of the frames subsequent to the first frame in an image processing apparatus according to the third embodiment.

FIG. 12 is a block diagram illustrating a hardware configuration of the image processing apparatus according to the first to the third embodiments.

DESCRIPTION OF THE EMBODIMENTS

Exemplary embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
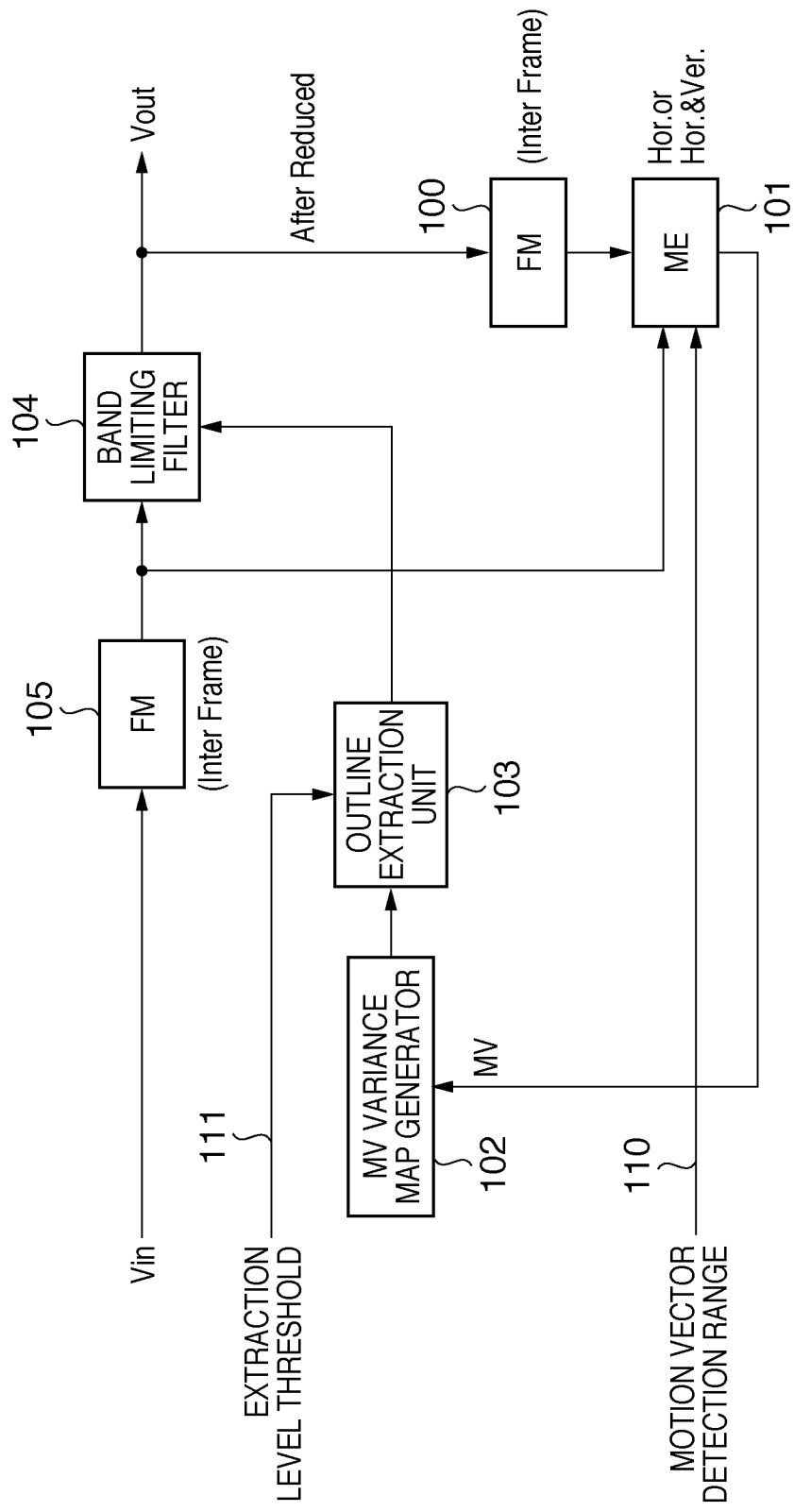
FIG. 1 is a block diagram illustrating a configuration of the main portion of an image processing apparatus according to a first embodiment of the present invention.

FIG. 1 is a block diagram illustrating a configuration of the main portion of an image processing apparatus according to the first embodiment of the present invention. In the first embodiment, the unit of image data processing is 4×4 pixels, and this is hereinafter referred to as a "target block".

Frame memories 105 and 100 store a single frame's worth of the image data (Vin) inputted to the image processing apparatus or of the pixel data outputted from a band limiting filter 104. For explanation purposes, decoded data of MPEG-compressed image data is used as the image data inputted here. A motion vector detector (ME) 101 detects a motion vector based on the target block of a past frame image stored in the frame memory 100 and the pixel data that corresponds to the target block inputted to the image processing apparatus. The motion vector detection range of the motion vector detector 101 can be freely set externally (by a user, for example). Numeral 110 denotes the information that specifies the motion vector detection range inputted from the exterior. In the first embodiment, the detection range is 8×8 pixels in size.

A motion vector variance map generator 102 inputs and stores the motion vector (MV) detected by the motion vector detector 101, and generates a motion vector variance value map by using the motion vector of the already-processed blocks surrounding the target block. The motion vector variance map generator 102 functions as a variance calculation unit, and is provided with a memory that can store a single frame's worth of a motion vector. An outline extraction unit 103 extracts, based on the motion vector variance value map generated by the motion vector variance map generator 102, outline perimeters of the variance value map, and outputs outline domain information. The outline extraction unit 103 can, at the time of outline extraction, adjust the outline extraction level according to an input or specified extraction level threshold 111. The band limiting filter 104 performs band limitation only in regard to the extracted outline domain based on the outline domain information provided from the outline extraction unit 103. The band limiting filter 104 is also provided with a path for outputting the input pixel data as-is, without band limitation.

Hereafter, operations of the image processing apparatus illustrated in FIG. 1 will be described with reference to the flowcharts in FIGS. 2 and 3.

In the first embodiment, a different processing is performed between the first frame and the frames subsequent thereto.

FIG. 2 is a flowchart illustrating processing of the first frame.

In step S1 in FIG. 2, the target block is outputted (V out) after passing through the frame memory 105 and the band limiting filter 104, and is stored in the frame memory 100.

FIG. 3 is a flowchart illustrating processing of the frames subsequent to the first frame.

First, in step S11, a single-frame's worth of an input frame image is stored in the frame memory 105. In the following step S12, the motion vector detector 101 compares a past frame image stored in the frame memory 100 and the current frame image stored in the frame memory 105 according to the specified detection range 110, and detects a motion vector (MV). In the following step S13, the motion vector detected in step S12 is outputted to the motion vector variance map generator 102. Thereby, the motion vector variance map generator 102 stores the input motion vector in a memory (not shown), and calculates a motion vector variance value based on the input motion vector and the surrounding motion vector that has already been stored in the memory. Then, a map of a single frame's worth of the calculated variance value is generated.

Hereafter, a calculation example of such a variance value will be described.

A variance value DiffV is calculated from the already-input motion vector MV1 (MV1$x$, MV1$y$) and the motion vector MV2 (MV2$x$, MV2$y$) of the target block by using a predetermined multiplier K.

$$V\text{last}=MV1x+MV1y\times K$$

$$V\text{tar}=MV2x+VM2y\times K$$

$$\text{Diff}V=|V\text{last}-V\text{tar}|$$

In the following step S14, the outline extraction unit 103 inputs the motion vector variance value map from the motion vector variance map generator 102, and extracts the outline domain of the variance value. The extraction level threshold 111 at this time is set externally (by a user, for example). This outline extraction process is performed by using a Sobel filter that uses a predetermined Sobel operator. In a case that the output value of the Sobel filter is the same as or more than the extraction level threshold that has been set externally, it is determined to be an outline domain. In the following step S15, an expansion process is performed so as to expand the outline domain extracted in step S14 to the peripheries thereof. Hereafter, the expansion process will be described in detail with reference to FIGS. 4 and 5.

Figure 4:
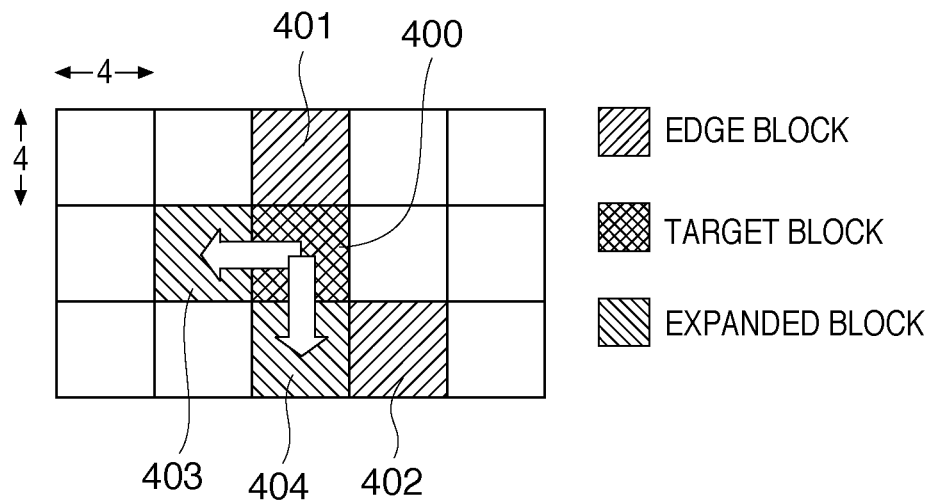
FIG. 4 is a diagram illustrating a part of image data to be processed according to the embodiment of the present invention.
Figure 5:
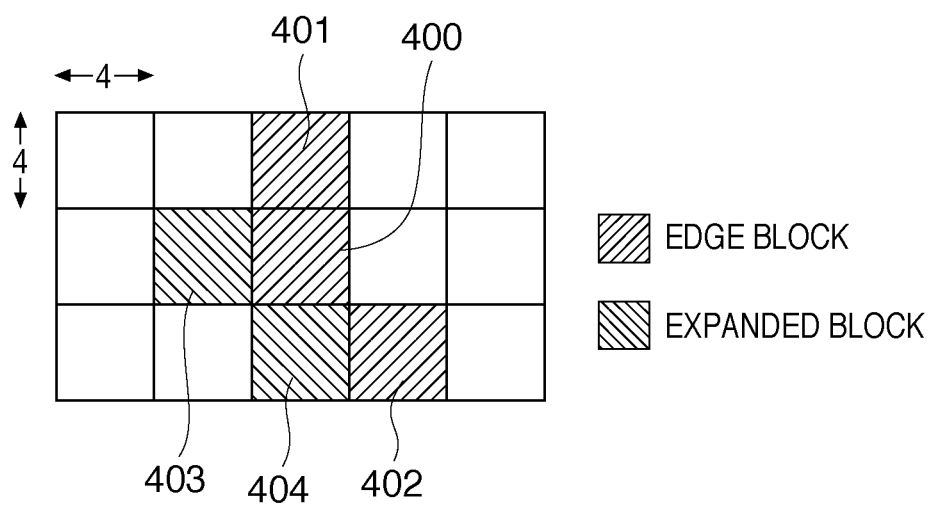
FIG. 5 is a diagram illustrating a result of the expansion process shown in FIG. 4.

FIGS. 4 and 5 are diagrams illustrating a part of the image data to be processed. Here, each square represents 4×4 pixels, which corresponds to a unit of image data processing.

At this point, from the variance value map, the variance value of the blocks included in the outline domain is compared with the variance values of the surrounding blocks that are adjacent to the outline domain in the vertical and horizontal directions. Then, in a case that the variance value of a surrounding block is lower than that of the target block, the block is determined to be an outline domain, and the outline domain is expanded to the surrounding block. Meanwhile, in a case that the variance value of a surrounding block is higher than that of the target block, the outline domain is not expanded in the direction of the surrounding block.

In FIG. 4, numerals 400, 401 and 402 denote edge blocks located in the outline domain, and the numerical 400 denotes the target block. Here, since a block 403 on the left and a lower block 404 have variance values lower than the variance value of the target block 400, the outline domain is expanded so as to include these blocks 403 and 404.

FIG. 5 is a diagram illustrating a result of the expansion process shown in FIG. 4.

This is an example in which the variance values of the left and the lower of blocks of the target block 400 are low, showing that the outline domain is expanded as indicated with expanded blocks 403 and 404. Here, since the blocks located on the right of the edge blocks 400 to 402 respectively have variance values higher than that of the edge blocks 400 to 402, the expansion process is not performed in the rightward direction.

With the outline extraction process described above, a single frame's worth of an outline domain map is generated.

In the following step S16, a filter process is performed on the outline domain with the band-limiting filter 104 based on the outline domain map obtained in step S14. In the first embodiment, an ε filter is used as the band limiting filter.

The ε filter limits bands of the pixel of interest by using a vicinity pixel neighboring the pixel of interest, and in doing so, the pixel value of the vicinity pixel is set according to the parameter ε. In other words, in a case that the pixel value of the vicinity pixel is not within the ε range with the pixel value of the pixel of interest in its center, band limitation is accomplished by replacing the pixel value of the vicinity pixel with the pixel value of the pixel of interest. If the pixel value of the vicinity pixel is within the ε range, the band limitation is accomplished by using the pixel value of the vicinity pixel as-is. Accordingly, in a case that the pixel of interest has a high probability of being an edge (with a large difference to the pixel value of the surrounding pixel), the parameter ε is high. Meanwhile, in a case that the probability of the pixel of interest being an edge is small (with a small difference to the pixel value of the surrounding pixel), the parameter ε is low. Thereby, mosquito noise that occurs at the edge portion can be removed. Furthermore, the parameter ε is low in regard to the pixel of a flat portion or a significant texture portion. Therefore, a filtering effect can be achieved while maintaining the details of the significant texture portion.

In this way, the band limiting filter 104 performs band limitation according to the outline domain information provided by the outline extraction unit 103 by setting the parameter ε high, in a case that it is determined to be an outline domain and otherwise by setting the parameter ε low.

In the following step S17, a single filter-processed frame is outputted. At the same time, the single processed frame is stored in the frame memory 100.

As described above, according to the first embodiment, a portion with an occurrence of coding noise, such as mosquito noise, included in image data can be accurately detected, and the noise removal process can be performed only on the portion with such a noise occurrence.

In the first embodiment, 4×4 pixels are used as a block to be processed, but the present invention is not limited to this, and the block may be, for example, 8×4, 4×8 or 8×8 pixels.

In the variance value calculation process performed by the motion vector variance map generator 102, only the motion vector that has already been inputted is used, but the present invention is not limited to this. For example, by calculating the average motion vector value of the surrounding blocks using the vectors of all the blocks that surround the target block, for a total of 8 blocks, a cumulative of the differentials between the motion vectors of the surrounding blocks and the average value thereof may be used as the variance value.

In the outline extraction process of the outline extraction unit 103, a Sobel filter is used, but another differential filter may be used.

In the process performed by the outline extraction unit 103, the expansion process is in the vertical and horizontal directions, but diagonal directions may also be included.

The frame memories 100 and 105 store frame images, but these may be field memories that store field images.

An ε filter is used for the band-limiting filter 104, but another simple low-pass filter may also be used.

Furthermore, the detection range of the motion vector detector 101 may be only horizontal, or have a different setting depending on the frame.

Furthermore, the threshold of the outline extraction unit 103 may have a different setting depending on the frame.

Second Embodiment

Figure 6:
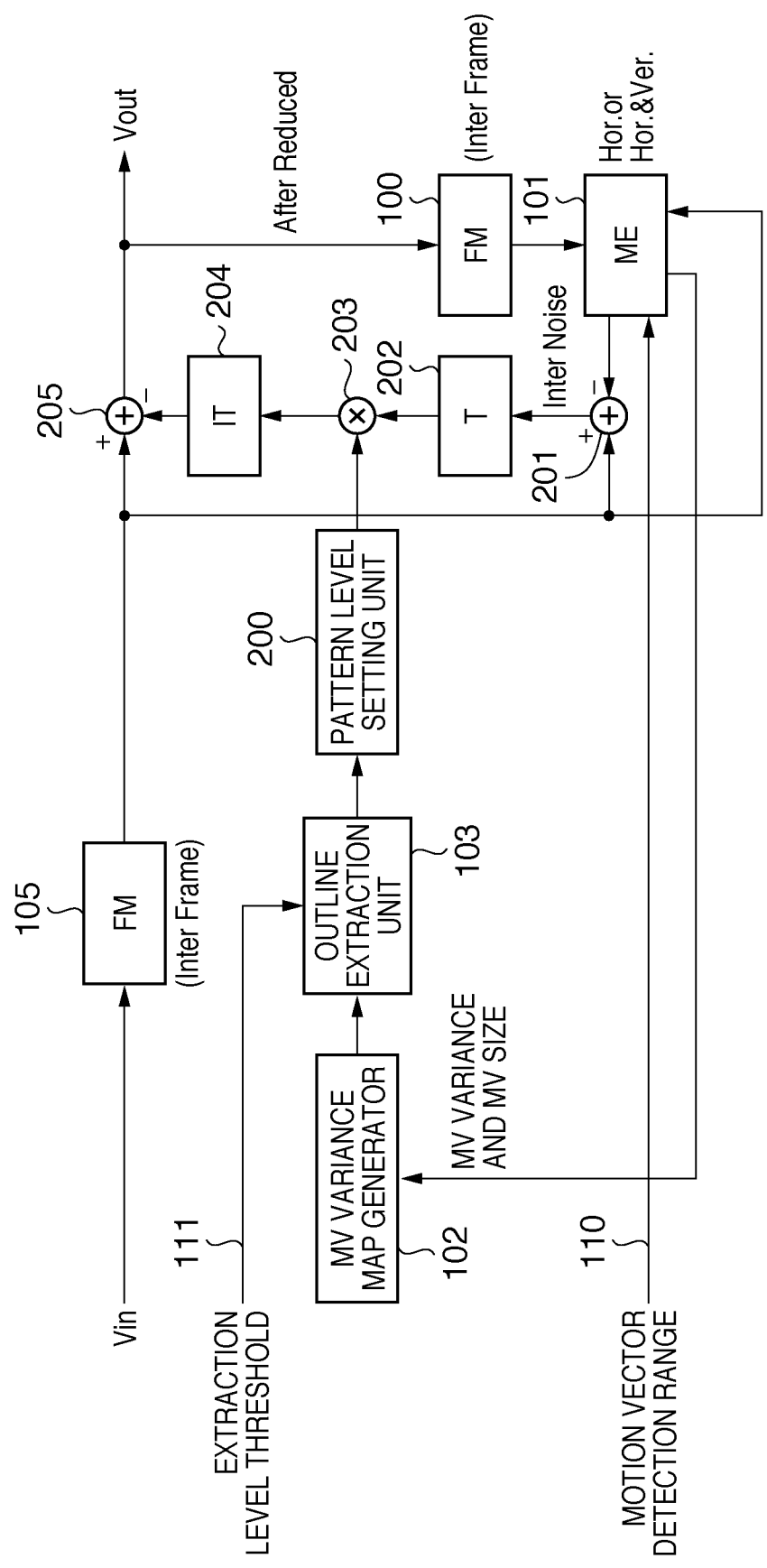
FIG. 6 is a block diagram illustrating a configuration of the main portion of an image processing apparatus according to a second embodiment of the present invention.

FIG. 6 is a block diagram illustrating a configuration of the main portion of an image processing apparatus according to the second embodiment of the present invention. In the second embodiment, a unit of image data processing is 4×4 pixels, and this is hereinafter referred to as a target block. In FIG. 6, the same numerical designations will be used for the portions that have the same functionality as in the first embodiment, and explanations thereof will be omitted. The motion vector detector (ME) 101 has, in addition to the functionality mentioned above in the first embodiment, functionality for outputting a predicted block of the preceding frame in a case that a motion vector is detected.

A pattern & level setting unit 200 sets a band and limitation amount for performing band limitation on the extracted outline domain, based on the outline domain information provided by the outline extraction unit 103.

Hereafter, the band and limitation amount will be described with reference to FIG. 7.

Figure 7:
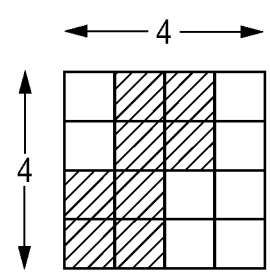
FIG. 7 is a diagram illustrating a frequency block pattern processed by an image processing apparatus according to the second embodiment.

FIG. 7 is a diagram illustrating a frequency block pattern to be processed by an image processing apparatus according to the second embodiment, and represents a single block (4×4 pixels) to be processed.

Here, the blocks to be processed are the blocks transformed to the frequency domain after a Hadamard transformation. Thus, the frequency component of the noise to be removed is set here. In FIG. 7, the hatched portions denote the components to be removed. At the same time, for these components to be removed, the multiplying level with which a multiplier 203 multiplies the noise component is set. Accordingly, at the level 1, noise components pass through as-is, and as the level approaches 0, the more noise components are removed.

A subtractor 201 obtains a differential between the pixel data of the target block read from the frame memory 105 and the pixel data of the predicted block outputted from the motion vector detector 101, and outputs the differential to an orthogonal transformer (T: two-dimensional Hadamard transformer, in this example) 202. The subtractor 201 functions as a differential block generating unit for obtaining a differential block which is the differential between the predicted block and the actual block. The orthogonal transformer 202 converts a single block's worth of the differential data provided from the subtractor 201 to a frequency domain block. The multiplier 203 multiplies, for each frequency component, the frequency domain block provided from the orthogonal transformer 202 by the level set by a pattern level setting unit 200. An inverse orthogonal transformer (IT: two-dimensional inverse Hadamard transformer) 204 inputs the multiplication result of the multiplier 203, and inversely transforms the frequency domain block to a pixel domain block. An adder 205 subtracts the pixel data of the pixel domain block transformed by the inverse orthogonal transformer 204 from the pixel data of the target block read from the frame memory 105.

Figure 8:
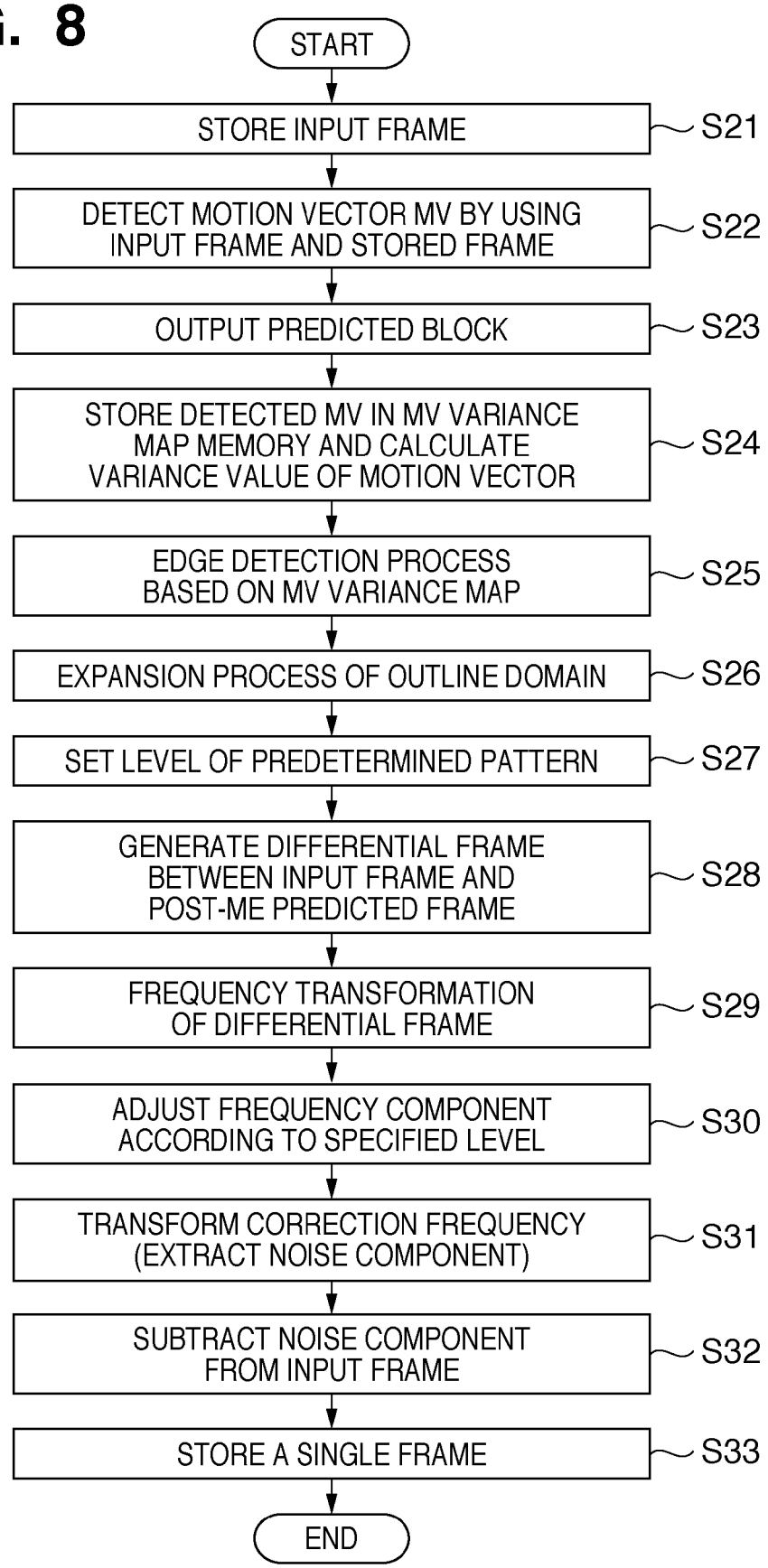
FIG. 8 is a flowchart illustrating processing of the frames subsequent to the first frame according to the second embodiment.

FIG. 8 is a flowchart illustrating processing of the frames subsequent to the first frame according to the second embodiment. In the second embodiment, as in the first embodiment, different processing is performed between the first frame and the frames subsequent thereto.

When the first frame is processed, as shown in the flowchart in FIG. 2, the target block is stored in the frame memory 105 and is outputted, skipping the adder 205; the target block is also stored in the frame memory 100.

Hereafter, processing of the frames subsequent to the first frame according to the second embodiment of the present invention will be described with reference to the flowchart in FIG. 8.

First, in step S21, a single frame's worth of an input frame image is stored in the frame memory 105. The process advances to step S22, in step S22, the motion vector detector 101 compares a past frame image stored in the frame memory 100 and the current frame image stored in the frame memory 105 according to the specified detection range so as to detect a motion vector (MV). In the following step S23, the motion vector detector 101 outputs a predicted block together with the motion vector. The process proceeds to step S24, and the motion vector detected in step S22 is outputted to the motion vector variance map generator 102. The motion vector variance map generator 102 stores the input motion vector in a memory, and calculates the motion vector variance value from the surrounding motion vector that has already been stored. Then, a map of a single frame's worth of the calculated variance value is generated.

Hereafter, a calculation example of such a variance value will be described.

A variance value DiffV is calculated from the already-input motion vector MV1 (MV$1x$, MV$1y$) and the motion vector MV2 (MV$2x$, MV$2y$) of the target block by using a predetermined multiplier K.

$V\text{last}=MV1x+MV1y \times K$ $V\text{tar}=MV2x+VM2y \times K$ $\text{Diff}V=|V\text{last}-V\text{tar}|$ In the following step S25, the outline extraction unit 103 extracts an outline domain of the variance value by inputting the motion vector variance value map. The extraction level threshold at this time is to be set externally (such as by a user). For this outline extraction process, a Sobel filter that uses a predetermined Sobel operator is used. Then, in a case that the output value of the Sobel filter is the same as or more than the extraction level threshold 111 that has been set externally, it is determined to be an outline domain. In step S26, an expansion process is performed so as to expand the outline domain extracted in step S25 to its peripheries. The expansion process is the same as the one in the first embodiment.

In the following step S27, in regard to the outline domain from the outline domain map outputted by the outline extraction unit 103, the pattern level setting unit 200 sets the frequency block pattern to be removed and the level thereof, and outputs them to the multiplier 203. Here, the pattern is a pattern indicated with the shaded portions in FIG. 7, and the level K is set to each of the shaded portions. The value K here is between 0 and 1 inclusive.

In the following step S28, the subtractor 201 obtains a differential between the pixel data of the target block provided from the frame memory 105 and the pixel data of the predicted block outputted from the motion vector detector 101 so as to generate a differential block. In step S29, the differential block obtained by the subtractor 201 is transformed to a frequency block by the orthogonal transformer (T) 202.

Next, in step S30, the multiplier 203 multiplies the frequency block by the level (K) provided from the pattern level setting unit 200, and outputs the result thereof to the inverse orthogonal transformer (IT) 204. In the following step S31, the inverse orthogonal transformer 204 inversely transforms the block outputted from the multiplier 203 so as to obtain pixel data. Then, in step S32, the adder 205 adds the pixel data of the target block to the pixel data of the block provided from the inverse orthogonal transformer 204, and outputs the result thereof.

As described above, according to the second embodiment, the noise removal process can be performed only to the portion with an occurrence of a coding noise, such as mosquito noise, in image data, and furthermore, analog noise that occurs between frames can also be removed.

In the second embodiment, 4×4 pixels are used as the block to be processed, but the present invention is not limited to this, and, for example, 8×4, 4×8, or 8×8 pixels may also be used.

In the variance value calculation process performed by the motion vector variance map generator 102, only the motion vector that has already been inputted is used, but the present invention is not limited to this. For example, by calculating the average motion vector value of the surrounding blocks by using the vectors of all the blocks that surround the target block, for a total of 8 blocks, a cumulative of the differentials between the motion vectors of the surrounding blocks and the average value thereof may be used as the variance value.

In the process of the outline extraction unit 103, a Sobel filter is used in the outline extraction process, but another differential filter may also be used.

In the process performed by the outline extraction unit 103, the expansion process is in the vertical and horizontal directions, but diagonal directions may also be included.

The frame memories 100 and 105 store frame images, but these may be field memories that store field images.

An ε filter is used for the band limiting filter 104, but another simple low-pass filter may also be used.

Furthermore, the detection range of the motion vector detector 101 may be limited to horizontal, or have a different setting depending on the frame.

Furthermore, the threshold of the outline extraction unit 103 may have a different setting depending on the frame.

Although the orthogonal transformer 202 and the inverse orthogonal transformer 204 are for Hadamard transformation, the present invention is not limited to this, and other orthogonal transforming processes, such as DCT, may also be used.

For the level of the pattern level setting unit 200, K is used for any frequency, but different values may also be set according to frequencies.

Third Embodiment

Figure 9:
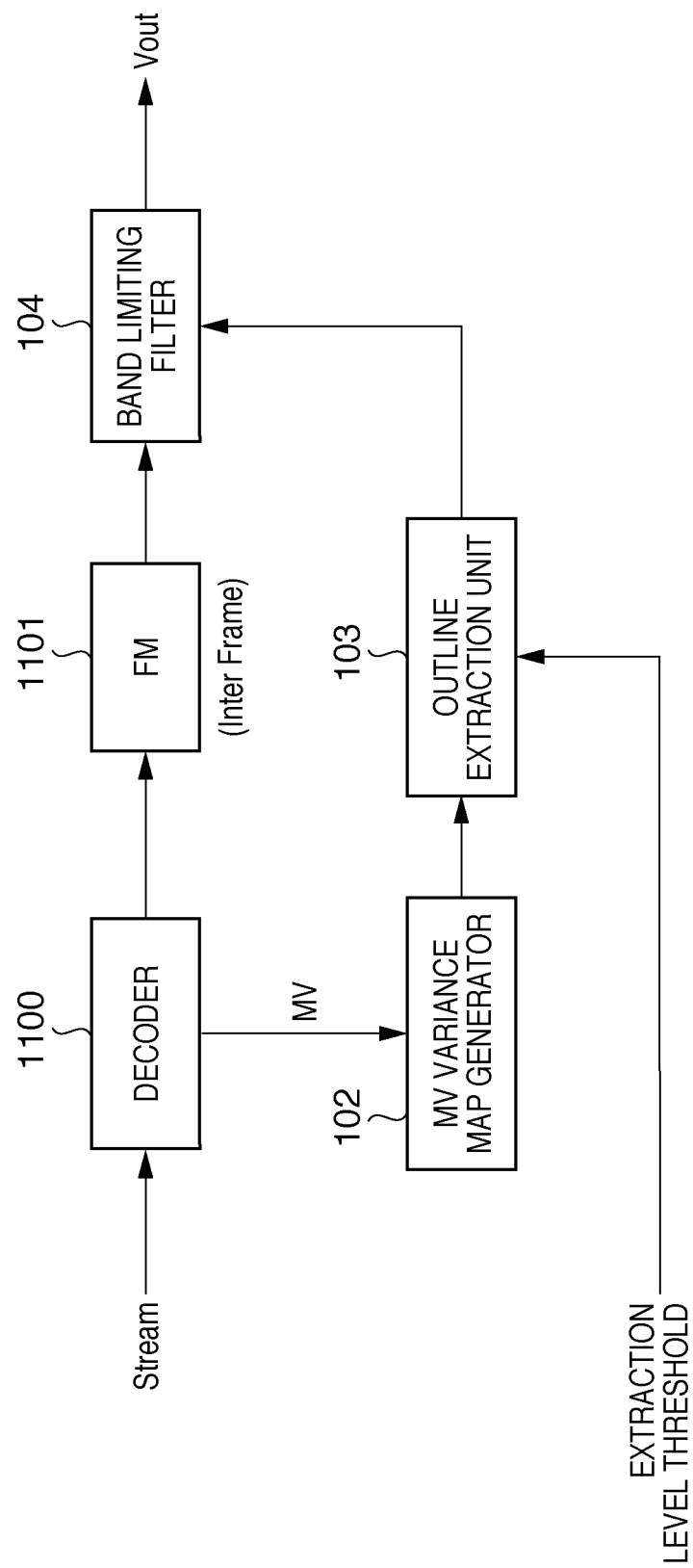
FIG. 9 is a block diagram illustrating a configuration of the main portion of an image processing apparatus according to a third embodiment of the present invention.

FIG. 9 is a block diagram illustrating a configuration of the main portion of an image processing apparatus according to the third embodiment of the present invention. In the Third embodiment, the unit of control is 16×16 pixels, which is a basic unit of decoded image of an image, and this represents the target block.

A decoder 1100 decodes an image from the stream inputted to the image processing apparatus. A frame memory 1101 stores a single frame's worth of an image decoded by the decoder 1100. The motion vector variance map generator 102 stores a detected motion vector, and generates a motion vector variance value map by using the motion vector of the already-processed block surrounding the target block. The motion vector variance map generator 102 is provided with a memory that can store a single frame's worth of the motion vector. The outline extraction unit 103 extracts outline peripheries of the variance value map based on the generated motion vector variance value map, and outputs outline domain information. The outline extraction unit 103 can, at the time of extraction, input the extraction level threshold 111, and adjust the level of extraction according to the threshold 111. The band limiting filter 104 limits the band only in regard to the extracted outline domain based on the outline domain information provided by the outline extraction unit 103. The band limiting filter 104 also has a pass system for outputting the input pixel data as-is without band limitation.

Hereafter, operation of the image processing apparatus illustrated in FIG. 9 will be described with reference to the flowcharts in FIGS. 10 and 11. In the third embodiment, like in the above-described embodiments, different processing is used between the first frame and the frames subsequent thereto.

FIG. 10 is a flowchart illustrating processing of the first frame according to the third embodiment.

Meanwhile, FIG. 11 is a flowchart illustrating processing of the frames subsequent to the first frame.

When the first frame is processed as shown in FIG. 10, first, in step S41, the decoder 1100 decodes a single frame's worth of the input stream. In the following step S42, the decoded frame is outputted by passing through the frame memory 1101 and the band limiting filter 104.

Hereafter, processing of the subsequent frames will be described with reference to the flowchart in FIG. 11.

First, in step S51, the decoder 1100 decodes a single frame's worth of the input stream. Next, in step S52, the decoded result is stored in the frame memory 1101. In step S53, the decoded motion vector (MV) is outputted to the motion vector variance map generator 102. Thereby, the motion vector variance map generator 102 stores the input motion vector in a memory (not shown), and calculates a motion vector variance value from the input motion vector and the surrounding motion vector that has already been stored. Then, proceeding to step S54, a map of a single frame's worth of the calculated variance value is generated.

Hereafter, a specific example of the variance value calculation process will be described.

A variance value DiffV is calculated from the already-inputted motion vector MV1 (MV1$x$ and MV1$y$) and the motion vector MV2 (MV2$x$ and MV2$y$) of the target block by using a predetermined multiplier K.

$V\text{last} = MV1x + MV1y \times K$ $V\text{tar} = MV2x + VM2y \times K$ $\text{Diff}V = |V\text{last} - V\text{tar}|$ In the following step S55, the outline extraction unit 103 extracts an outline domain of the variance value by inputting the motion vector variance value map. At this time, the extraction level is according to the extraction level threshold 111 that is set externally (by a user, for example).

For this outline extraction process, a Sobel filter that uses a predetermined Sobel operator is used. If the output value of the Sobel filter is the same as or more than the extraction level threshold that has been set externally, it is determined to be an outline domain.

Then, proceeding to step S56, the expansion process is performed so as to expand the extracted outline domain to the surrounding area thereof. The expansion process is as described above with reference to FIGS. 4 and 5. The outline extraction process is performed accordingly, and thereby a single frame's worth of an outline domain map is generated.

In the following step S57, based on the outline domain map, the band limiting filter 104 performs a filtering process on the outline domain. In the third embodiment, an $\epsilon$ filter is used as the band limiting filter.

The $\epsilon$ filter limits bands of the pixel of interest by using vicinity pixels neighboring the pixel of interest, and in doing so, the pixel value of the vicinity pixel is set according to the parameter $\epsilon$. In other words, in a case that the pixel value of the vicinity pixel is not within the $\epsilon$ range with the pixel value of the pixel of interest in its center, band is limited by replacing the pixel value of the vicinity pixel with the pixel value of the pixel of interest. Meanwhile, in a case that the pixel value of the vicinity pixel is within the $\epsilon$ range, band is limited by using the pixel value of the vicinity pixel as-is. Accordingly, if the pixel of interest has a high probability of being an edge, the parameter $\epsilon$ is set high. If the probability of the pixel of interest being an edge is low, the parameter $\epsilon$ is set low. Thereby, mosquito noise that occurs at edge portions can be removed. Furthermore, since the parameter $\epsilon$ for the pixels at flat portions or significant texture portions is low, the filtering result can be obtained while maintaining the details of the significant texture portion.

In this way, based on the outline domain information provided from the outline extraction unit 103, the band limitation is performed by setting the parameter $\epsilon$ high when it is an outline domain, and low in other cases. Then, proceeding to step S58, a single filtering-processed frame is outputted.

Other Embodiments

FIG. 12 is a block diagram illustrating a hardware configuration of an image processing apparatus according to the above-mentioned the first to the third embodiments.

Numeral 1000 denotes a central processing unit (CPU) that controls the image processing apparatus and performs various types of processing. A memory 1001 is a memory that provides a memory area necessary for the operating system (OS), software, data, and calculation required for control operation of the image processing apparatus. The memory 1001 is used also as a work area when the CPU 1000 performs various control processes. Accordingly, the above-mentioned respective process steps in the flowchart are accomplished through collaboration of a program stored in the memory 1001 and the CPU 1000. A system bus 1002 connects the CPU 1000 to the respective portions, and is used to exchange data and control signals therebetween. Numeral 1003 denotes a memory device, such as hard disk, that stores various types of software. Numeral 1004 denotes a memory device that stores video data, and includes, for example, hard disk and MO. A display unit 1005 is used to display an image or a message. A communication interface unit 1007 transmits data through a communication circuit 1008, and is connected to LAN, a public line, a wireless line, broadcast signals, and so on that are external to the device. A console unit 1006 is used for starting up the image processing apparatus and setting various conditions. The console unit 1006 is also used for specifying information 110 that specifies the above-mentioned motion vector detection range and the extraction level threshold 111 at the time of outline extraction.

The memory 1001 includes an area for storing OS and software for controlling operation of the entire image processing apparatus, executing various types of software, and reading image data, and a working area for storing various calculation parameters and so on.

In such a configuration, prior to processing, video data to be coded is selected using the control portion 1006 from among the video data stored in the memory device 1004, and starting up of the computer is instructed. This loads the software stored in the memory device 1003 into the memory 1001 through the bus 1002, thereby starting up the software. Then, an operation for coding the video data stored in the memory device 1004 is executed by the CPU 1000 through the program code according to the flowcharts shown in FIGS. 2, 3, 8, 10, and 11.

In such a configuration, an image processing apparatus according to this embodiment functions as an apparatus that accomplishes noise removal according to Embodiments 1 to 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2007-258037, filed Oct. 1, 2007, which is hereby incorporated by reference herein in its entirety.

What is claimed is:

1. An image processing apparatus for removing a noise component of decoded image data in which an image stream generated through a lossy coding has been decoded, the apparatus comprising:
    a storage unit configured to input and store a frame image for each block;
    a motion vector detector configured to detect a motion vector of each block based on the frame image stored in the storage unit and a newly input frame image;
    a holding unit configured to hold a single frame's worth of a motion vector of an objective block and a single frame's worth of motion vectors of surrounding blocks of the objective block detected by the motion vector detector;
    a difference calculator configured to calculate the difference between each of the held motion vectors of surrounding blocks and the held motion vector of the objective block to generate a difference value map;
    an outline extraction unit configured to extract blocks in an outline domain included in the frame image in a case that a value in which the difference value map generated by the difference calculator is differentiated using a differential filter is larger than a threshold; and
    a filter processing unit configured to perform filter processing for each block of the blocks in the outline domain extracted by the outline extraction unit.

2. The image processing apparatus according to claim 1, further comprising an expansion unit configured to expand the outline domain to include the surrounding blocks in a case that a difference between the objective block in the outline domain and each of the surrounding blocks is small.

3. The image processing apparatus according to claim 1, further comprising a range setting unit configured to specify a range for the motion vector detector to detect a motion vector.

4. The image processing apparatus according to claim 1, further comprising a threshold setting unit configured to specify the threshold.

5. The image processing apparatus according to claim 1, further comprising an acquisition unit configured to acquire a predicted block of a preceding frame based on the motion vector detected by the motion vector detector,
    wherein the filter processing unit has:
    a differential block generator configured to obtain a differential between a newly input frame image block and the predicted block and to generate a differential block;
    an orthogonal transformer configured to perform an orthogonal transformation on the differential block generated by the differential block generator so as to output a frequency block;
    a pattern level setting unit configured to set a pattern level in regard to the frequency block according to the blocks in the outline domain extracted by the outline extraction unit;
    a multiplier configured to multiply the frequency block by the pattern level;
    an inverse orthogonal transformer configured to perform an inverse orthogonal transformation on the multiplication result by the multiplier; and
    a subtractor configured to subtract the result of the inverse orthogonal transformation from the newly input frame image block.

6. An image processing apparatus for removing a noise component of decoded image data in which an image stream generated through a lossy coding has been decoded, the apparatus comprising:
    a decoder configured to decode an image stream generated through a lossy coding;
    a storage unit configured to store for each block a frame image decoded by the decoder;
    a holding unit configured to hold a single frame's worth of a motion vector of an objective block and a single frame's worth of motion vectors of surrounding blocks of the objective block of the frame image;
    a difference calculator configured to calculate the difference between each of the held motion vectors of surrounding blocks and the held motion vector of the objective block to generate a difference value map;
    an outline extraction unit configured to extract blocks in an outline domain included in the frame image in a case that a value in which the difference value map generated by the difference calculator is differentiated using a differential filter is larger than threshold; and
    a filter processing unit configured to perform filter processing for each block of the blocks in the outline domain extracted by the outline extraction unit.

7. The image processing apparatus according to claim 6, further comprising a threshold setting unit configured to specify the threshold.

8. The image processing apparatus according to claim 6, further comprising an acquisition unit configured to obtain a predicted block of a preceding frame based on the motion vector,
    wherein the filter processing unit includes:
    a differential block generator configured to obtain a differential between a newly input frame image block and the predicted block and generate a differential block;
    an orthogonal transformer configured to perform an orthogonal transformation on the differential block generated by the differential block generator so as to output a frequency block;

a pattern level setting unit configured to set a pattern level in regard to the frequency block according to the blocks in the outline domain extracted by the outline extraction unit;

a multiplier configured to multiply the frequency block by the pattern level;

an inverse orthogonal transformer configured to perform an inverse orthogonal transformation on the multiplication result of the multiplier; and a subtractor configured to subtract the result of the inverse orthogonal transformation from the newly input frame image block.

9. An image processing method for removing a noise component of decoded image data in which an image stream generated through a lossy coding has been decoded, the method comprising:

inputting and storing a frame image for each block in a frame memory;

detecting a motion vector of each block based on the frame image stored in the frame memory and a newly-input frame image;

holding a single frame's worth of a motion vector of an objective block and a single frame's worth of motion vectors of surrounding blocks of the objective block detected in the detecting step;

calculating the difference between each of the held motion vectors of surrounding blocks and the held motion vector of the objective block to generate a difference value map;

extracting blocks in an outline domain included in the frame image in a case that a value in which the difference value map generated in the calculating step is differentiated using a differential filter is larger than a threshold; and performing filter processing for each block of the blocks in the outline domain extracted in the extracting step.

10. The image processing method according to claim 9, further comprising expanding the outline domain to include the surrounding blocks in a case that a difference between the objective block in the outline domain and each of the surrounding blocks is small.

11. The image processing method according to claim 9, further comprising specifying a motion vector detection range for the detecting step.

12. The image processing method according to claim 9, further comprising specifying the threshold.

13. The image processing method according to claim 9, further comprising obtaining a predicted block of a preceding frame based on the motion vector detected in the detecting step, wherein performing filter processing includes:

obtaining a differential between a newly input frame image block and the predicted block to generate a differential block;

performing an orthogonal transformation on the differential block so as to output a frequency block;

setting a pattern level in regard to the frequency block according to the blocks in the outline domain extracted in the extracting step;

multiplying the frequency block by the pattern level;

performing an inverse orthogonal transformation on the multiplication result in the multiplying step; and subtracting the result of the inverse orthogonal transformation from the newly input frame image block.

14. An image processing method for removing a noise component of decoded image data in which an image stream generated through a lossy coding has been decoded, the method comprising:

decoding an image stream generated through a lossy coding;

holding a single frame's worth of a motion vector of an objective block and a single frame's worth of motion vectors of surrounding blocks of the objective block of a frame image;

calculating the difference between each of the held motion vectors of surrounding blocks and the held motion vector of the objective block to generate a difference value map;

extracting blocks in an outline domain included in the frame image in a case that a value in which the difference value map generated in the calculating step is differentiated using a differential filter is larger than a threshold; and performing filter processing for each block of the blocks in the outline domain extracted in the extracting step.

15. The image processing method according to claim 14, further comprising specifying the threshold.

16. The image processing method according to claim 14, further comprising obtaining a predicted block of a preceding frame based on the motion vector, wherein performing filter processing includes:

obtaining a differential between a newly input frame image block and the predicted block to generate a differential block;

performing an orthogonal transformation on the differential block so as to output a frequency block;

setting a pattern level in regard to the frequency block according to the blocks in the outline domain extracted in the extracting step;

multiplying the frequency block by the pattern level;

performing an inverse orthogonal transformation on the multiplication result in the multiplying step; and subtracting the result of the inverse orthogonal transformation from the newly input frame image block.

* * * * *